Figure 1:
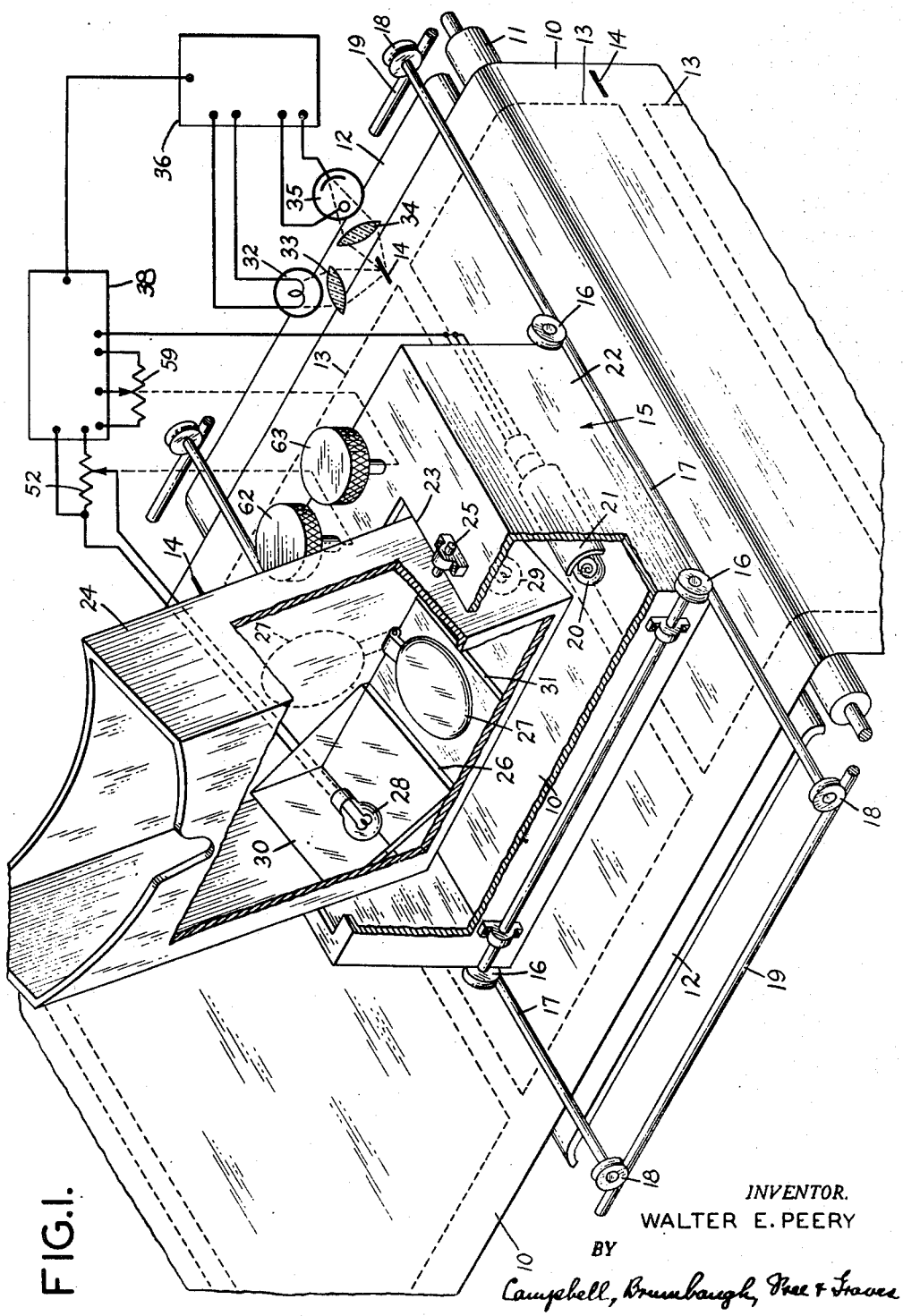

Oct. 10, 1950 W. E. PEERY 2,524,926
WEB VIEWING MECHANISM
Filed April 21, 1948 2 Sheets-Sheet 1

INVENTOR.
WALTER E. PEERY
BY
Campbell, Brumbaugh, Free & Graves
HIS ATTORNEYS.

INVENTOR.
WALTER E. PEERY
BY
Campbell, Brumbaugh, Free & Graves
HIS ATTORNEYS.

Patented Oct. 10, 1950

2,524,926

UNITED STATES PATENT OFFICE 2,524,926

WEB VIEWING MECHANISM

Walter E. Peery, Morristown, N. J., assignor to Time, Incorporated, New York, N. Y., a corporation of New York Application April 21, 1948, Serial No. 22,392

9 Claims. (Cl. 88—14)

The present invention relates to devices utilizing the stroboscopic effect for viewing mechanisms in motion. More specifically, it has to do with new and improved apparatus of this character, for viewing a moving web of the type used in printing presses, although it is not limited to such use.

In the art of printing a recurrent pattern or patterns on paper, textiles or the like, it is often necessary or desirable for the pressman to make a careful and detailed examination of the moving web to determine the quality, color, registration or other characteristics of the matter printed thereon during a printing operation, for example. At the present time, web speeds of 1,000 feet per minute and over are common, so that such examinations are impossible without slowing down or stopping the press. With practice, it is possible to make a cursory examination of the web provided the speed of the latter is relatively low. However, a detailed examination cannot be made without stopping the press. Neither alternative is satisfactory since it reduces the net production of the press and hence, increases operating costs.

The principal object of the invention, accordingly, is to provide new and improved apparatus for viewing mechanism such as a moving web, for example, without slowing down or stopping its motion.

Another object of the invention is to provide new and improved web viewing apparatus of the above character which enables a moving web to be viewed with a minimum of eye strain or other discomfort to the person making the examination.

Still another object of the invention is to provide new and improved web viewing apparatus of the above character which is easily movable to facilitate viewing different portions of a moving web.

The objects of the invention are attained by providing web viewing apparatus in which flashes of light of relatively high intensity are directed to the moving web from a suitable source, in timed relation with the movement of the web. Preferably, means is provided for preventing extraneous light from falling on the portion of the web which is illuminated by the flashes of light. The illuminated portion of the web is adapted to be viewed through suitable viewing means which is also preferably designed to keep out light from extraneous sources. The viewing means is preferably adjustable to enable the user to make an examination with a minimum of discomfort. Also, the viewing means includes means for providing a field of illumination in relation to which the web is adapted to be viewed, whereby a detailed examination of the web can be made with a minimum of eye strain.

It will be apparent, therefore, that the novel web viewer of the invention permits detailed examination without stopping or reducing the speed of the press. Further, close examination of the web can be readily effected with a minimum of discomfort and eye strain to the person making the examination.

Figure 2:
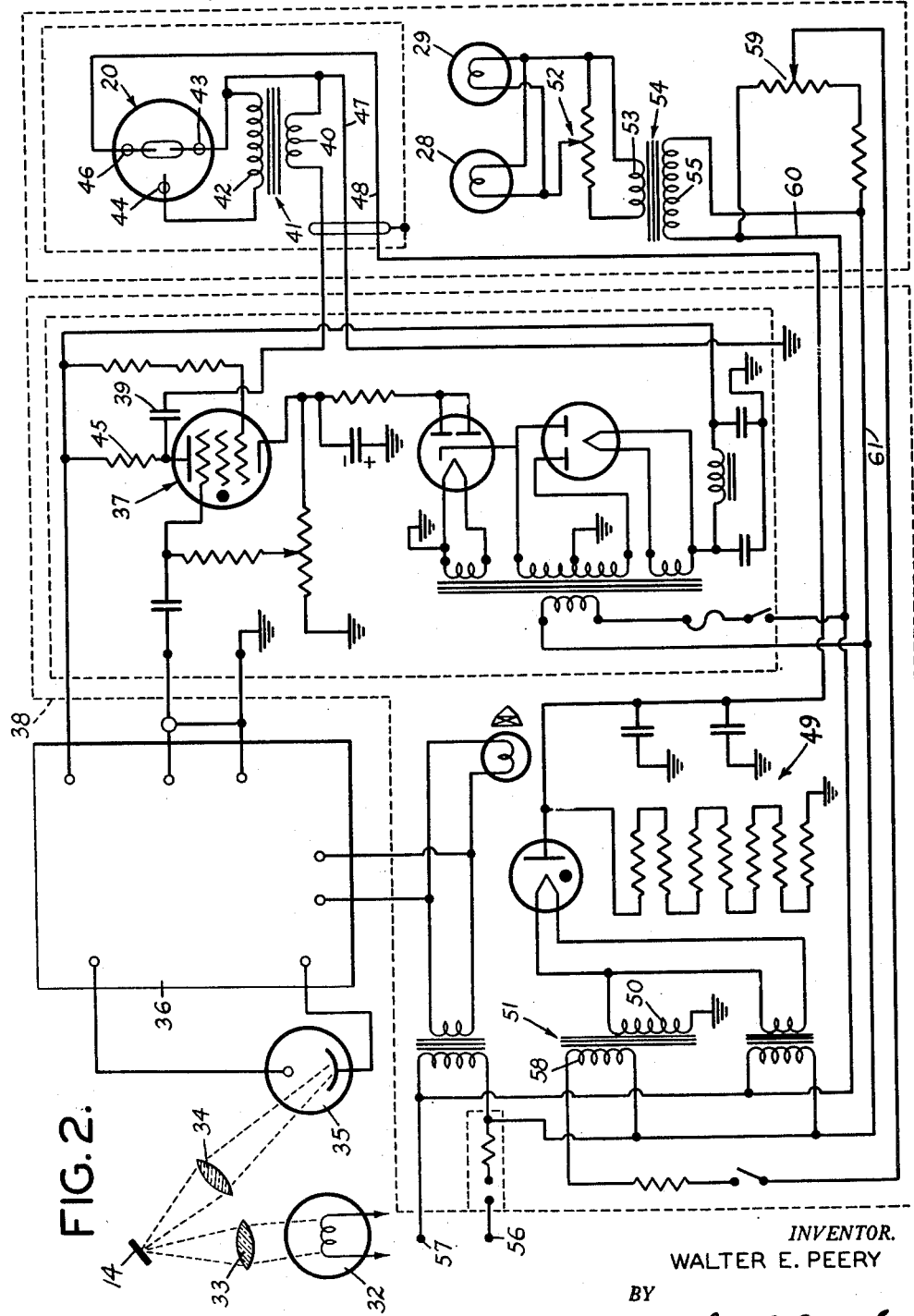

Additional objects and advantages of the invention will be apparent from the following detailed description of a typical embodiment, taken in conjunction with the accompanying drawings, in which:

Fig. 1 is a schematic view in perspective of web viewing apparatus constructed according to the invention; and Fig. 2 illustrates schematically an electrical control system for use in the web viewer shown in Fig. 1.

While the novel viewing device of the present invention is adapted for use in a wide variety of applications, it will be described herein, by way of example, as applied to the examination of a moving web carrying printed matter, or the like, as in printing operations.

In Fig. 1 is shown a web 10 moving at relatively high speed over a suitable roller 11 and a shoe 12, preferably made of suitable opaque material. The web 10 carries a periodically recurring pattern 13 which may be, for example, printed designs, pictures, editorials or other matter which is to be examined. The web 10 also carries suitable register indicia 14 which are associated with the successive printed areas 13, respectively.

A typical viewer constructed according to the invention, may comprise, for example, a carriage 15 mounted on a plurality of rollers 16 resting on suitable guides 17 by means of which the carriage 15 may be moved transversely of the web 10. The guides 17 may also be provided with suitable rollers 18 movable on the guides 19 to facilitate the movement of the carriage 15 in the direction of movement of the web 10. The guides 19 may be carried by any suitable support such as the frame of the press (not shown), for example.

Mounted within the carriage 15 is a suitable lamp 20 provided with a reflector 21 for directing light to the portion of the web 10 lying directly beneath the carriage 15. The lamp 20 is preferably designed to emit a relatively high intensity flash of light of short time duration and it may be, for example, a Sylvania lamp type R4330. The carriage 15 is also provided with a downwardly extending skirt portion 22 which serves to prevent any appreciable amount of extraneous light from falling upon the portion of the web 10 illuminated by the lamp 20.

Formed in the top of the carriage 15 is an aperture 23 within which is mounted a suitable viewing tube 24. The upper part of the viewing tube 24 is preferably shaped to conform to the human face and it is preferably mounted on pivots 25 (only one being shown in Fig. 1) so that the angle of the viewing tube 24 can be adjusted to the convenience and comfort of the operator.

In the bottom of the viewing tube 24 is an aperture 26 through which the illuminated portion of the web 10 can be viewed. Also mounted within the viewing tube 24 is a suitable lens 27 which is normally maintained folded against the side wall of the viewing tube 24 as shown in dotted lines and which can be moved over the viewing aperture 26 to the position shown in full lines when it is desired to make a detailed examination of matter on the web 10.

In accordance with the invention, the illuminated portion of the web 10 is viewed in relation to a field of illumination so that the examination can be made with a minimum of eye strain. The field of illumination may be provided within the viewing tube 24 by means of the lamps 28 and 29 which are mounted on opposite sides of the viewing aperture 26. Preferably, the illumination from the lamps 28 should be diffused as by means of frosted plates of glass 30 and 31 which may be mounted over the lamps 28 and 29, as shown.

In order to produce apparent stoppage of the motion of the web 10 during the examination thereof, the lamp 20 must be momentarily lighted periodically in timed relation with the movement of the web 10. This may be accomplished by directing a beam of light from a suitable lamp 32 through a lens system 33 to the web 10 in the path of the register indicia 14. Light reflected from the web 10 may be directed by a lens system 34 to a conventional photoelectric cell 35 which may be connected to the input terminals of any suitable photoelectric cell amplifier 36 (Fig. 2). It will be understood that each time a register mark 14 passes the photocell 35, a corresponding current pulse will appear in the output of the amplifier 36.

The amplified pulses in the output of the amplifier 36 may be used to fire periodically a conventional grid controlled gas discharge device 37 in a control system 38 (Fig. 2). Each time the gas discharge device 37 is fired, it becomes conducting and discharges a condenser 39 through the primary winding 40 of a transformer 41, the secondary winding 42 of which is connected to the cathode 43 and starter electrode 44 of the lamp 20. After each discharge, the condenser 39 may be charged through a resistor 45 in the well-known manner.

A relatively high voltage of the order of, say several thousand volts is continuously impressed across the cathode 43 and anode 46 of the lamp 20 so that each time the starter electrode 44 of the latter is pulsed, the lamp 20 emits a high intensity flash of a relatively short time duration. The relatively high voltage required for operation of the tube 20 may be supplied through the conductors 47 and 48 from a conventional half-wave rectifier filter circuit 49 which may be supplied with A. C. from the secondary winding 50 of a suitable power transformer 51.

In order to minimize eye strain by the observer in making the examination, it is desirable to provide means for varying the intensity of both the illumination of the web 10 and of the field of illumination in the viewing tube 24, in relation to which the web 10 is viewed. Adjustment of the field of illumination in the viewing tube 24 may be easily effected by energizing the lamps 28 and 29 from a potentiometer 52 (Fig. 2) connected to the secondary winding 53 of a transformer 54 having a primary winding 55 connected to the power lines 56 and 57 (Fig. 2).

Adjustment of the intensity of the flash emitted by the lamp 20 may be effected by controlling the voltage applied to the anode 46. This may be accomplished by energizing the primary winding 58 of the power transformer 51 by a potentiometer 59 connected by the conductors 60 and 61, respectively, to the power lines 57 and 56.

In order to facilitate the adjustment of the relative intensities of the lamp 20 and the lamps 28 and 29 by the operator during his examination of the web 10 a pair of control knobs 62 and 63 may be mounted on the carriage 15 (Fig. 1) and suitably connected for adjustment of the potentiometers 52 and 59, respectively.

In operation, the person making the examination moves the carriage 15 to the portion of the web 10 which is to be examined and places his face over the top of the viewing tube 24. Each time a register indicia 14 passes by the photoelectric cell 35, the light directed thereto from the web 10 is reduced, producing a current pulse which is amplified and supplied to the control grid of the gas discharge device 37 (Fig. 2). The gas discharge device 37 thus becomes conducting and discharges the condenser 39 through the primary winding 40 of the transformer 41 and causes the lamp 20 to emit a high intensity flash of a relatively short duration.

Since the flashes of the lamp 20 occur in properly timed relation to the movement of the web 10, the latter appears to stand still so that the printed matter 13 thereon can be examined through the viewing aperture 26 in the viewing tube 24. The relative intensities of the lamp 20 and the lamps 28 and 29 are then adjusted by means of the knobs 62 and 63 for minimum eye strain. If a very close and detailed examination is desired, the lens 27 can be moved into position over the aperture 26 to provide an enlarged image of the portion of the web 10 being inspected.

From the foregoing, it will be apparent that the invention provides a novel and highly effective means for making detailed examinations of mechanisms in motion, particularly a web moving at relatively high speeds as in the printing industry, for example. By illuminating the web in timed relation with the movement thereof, detailed examinations can be made without stopping or reducing the speed of the press. Further, by viewing the illuminated portion of the web in relation to a field of illumination, the examination can be made with a minimum of eye strain or other discomfort.

It will be understood that the typical embodiment of the invention described above and illustrated in the drawings, by way of example, is susceptible of considerable modification within the spirit of the invention. For example, the shapes and sizes of the several parts comprising the viewing apparatus can be changed without departing from the invention. Also, other electronic control systems than that disclosed can be employed for illuminating the web in timed relation to the movement thereof, as will be apparent to those skilled in the art. The specific embodiment herein disclosed, therefore, is not to be regarded as limiting the scope of the following claims.

I claim:

1. In apparatus for examining a moving web having a periodically recurring pattern thereon, the combination of web illuminating means disposed to illuminate selectively different portions of the web, first means for illuminating a selected web portion periodically by said illuminating means in timed relation with the movement of the web, means for preventing extraneous light from reaching the illuminated portion of said web, viewing means carried by said illuminating means for viewing at least a portion of the web portion illuminated by said illuminating means, means carried by said viewing means for providing a field of constant illumination immediately adjacent the portion of the web viewed by said viewing means and independent of said first means for illuminating the web, and means for preventing extraneous light from reaching said field of illumination.

2. In apparatus for examining a moving web having a periodically recurring pattern thereon, the combination of web illuminating means disposed to illuminate selectively different portions of the web, first means for illuminating a selected web portion periodically by said illuminating means in timed relation with the movement of the web, viewing means carried by said illuminating means for viewing at least a portion of the web portion illuminated by said illuminating means, means carried by the viewing means for providing a constant field of illumination immediately adjacent the portion of the web viewed by said viewing means and independent of said first illuminating means, and means for adjusting the relative intensities of the illumination of the web by said illuminating means and of said constant field of illumination.

3. In apparatus for examining a moving web having a periodically recurring pattern thereon, the combination of a carriage mounted for relative movement in a plane substantially parallel to the web, web illuminating means on the carriage disposed to illuminate selectively different portions of the web, first means for illuminating a selected web portion periodically by said illuminating means in timed relation with the movement of the web, viewing means on the carriage for viewing at least a portion of the web portion illuminated by said illuminating means, means in the viewing means for providing a field of constant illumination independent of said first illuminating means and immediately adjacent the portion of the web illuminated by the first illuminating means, and means for preventing extraneous light from reaching said illuminated portion of the web.

4. In apparatus for examining a moving web having a periodically recurring pattern including control indicia thereon, the combination of a carriage mounted for relative movement in mutually perpendicular directions in a plane substantially parallel to the web, a first light source on the carriage for illuminating the web, a light shield over said light source for preventing extraneous light from reaching the web portion illuminated by said light source, electronic means responsive to said control indicia on the web for energizing said light source momentarily and periodically in timed relation to the movement of the web, a viewing tube mounted for tilting movement in said shield and having an aperture through which an illuminated portion of the web is adapted to be viewed, and means independent of first light source for illuminating the web for providing a field of constant illumination in said viewing tube immediately adjacent the said aperture.

5. In apparatus for examining a moving web having a periodically recurring pattern including control indicia thereon, the combination of a carriage mounted for relative movement in mutually perpendicular directions in a plane substantially parallel to the web, a first light source on the carriage for illuminating the web, a light shield over said light source for preventing extraneous light from reaching the web portion illuminated by said light source, electronic means responsive to said control indicia on the web for energizing said light source momentarily and periodically in timed relation to the movement of the web, a viewing tube mounted for tilting movement in said shield and having an aperture through which an illuminated portion of the web is adapted to be viewed, means independent of the first light source for illuminating the web for providing a field of constant illumination about said aperture in said viewing tube in relation to which said illuminated web portion is adapted to be viewed, and lens means selectively movable into and out of alignment with said aperture.

6. In apparatus for examining a moving web having a periodically recurring pattern including control indicia thereon, the combination of a carriage mounted for relative movement in mutually perpendicular directions in a plane substantially parallel to the web, a first light source on the carriage for illuminating the web, a light shield over said light source for preventing extraneous light from reaching the web portion illuminated by said light source, electronic means responsive to said control indicia on the web for energizing said light source momentarily and periodically in timed relation to the movement of the web, a viewing tube mounted for tilting movement in said shield and having an aperture through which an illuminated portion of the web is adapted to be viewed, means independent of the first light source for providing a field of constant illumination about said aperture in said viewing tube in relation to which said illuminated web portion is adapted to be viewed, lens means selectively movable into and out of alignment with said aperture, means for controlling the intensity of illumination of said web and means for controlling the intensity of said field of illumination.

7. In apparatus for examining a moving mechanism, the combination of a carriage movable in relation to said mechanism, a first light source on said carriage, a light shield over said light source for preventing any appreciable extraneous light from reaching the portion of said mechanism illuminated by said source, electronic means for momentarily and periodically illuminating at least a portion of said mechanism by said light source in timed relation with the movement of said mechanism, a viewing tube mounted in said light shield and having an aperture through which said moving mechanism is adapted to be viewed, means independent of the first light source for providing a field of constant illumination in said tube immediately adjacent the said aperture, means for controlling the intensity of illumination of said moving mechanism, and means for controlling the intensity of said field of illumination.

8. Apparatus for examining a subject including, in combination, shield means having a viewing opening for accommodating the eye of an observer and defining a light path between the subject and the viewing opening, said shield means excluding extraneous light from said light path, first illuminating means providing intermittently effective high intensity light for illuminating said subject, said shield means being adapted to direct light as reflected from said subject along said light path to the said viewing opening and the eye of the observer, a constant light source independent of the first illuminating means for providing a secondary field of illumination within said shield and immediately adjacent the viewing opening with at least a portion of the light of the secondary field impinging upon the eye of the observer, and means for adjusting the relative intensities of the light reflected from the subject to the eye of the observer and the light of said secondary field of illumination impinging upon the eye of the observer.

9. Apparatus for examining a subject as set forth in claim 8 including first adjusting means for varying the intensity of the light of said first illuminating means for the subject and second adjusting means for varying the intensity of the said secondary field of illumination, said first and second adjusting means being mutually independent.

WALTER E. PEERY.

REFERENCES CITED

The following references are of record in the file of this patent:

UNITED STATES PATENTS

| Number | Name | Date |
|---|---|---|
| 1,615,216 | Aruger | Jan. 25, 1927 |
| 1,864,677 | Sparkes | June 28, 1932 |
| 1,929,298 | Wessels | Oct. 3, 1933 |
| 2,108,767 | FitzGerald | Feb. 15, 1938 |
| 2,374,991 | Gordon | May 1, 1945 |
| 2,419,339 | Dennis | Apr. 22, 1947 |

FOREIGN PATENTS

| Number | Country | Date |
|---|---|---|
| 207,888 | Great Britain | Dec. 10, 1928 |